US012394914B2

(12) United States Patent
Huang

(10) Patent No.: US 12,394,914 B2
(45) Date of Patent: Aug. 19, 2025

(54) ANTENNA SYSTEM

(71) Applicant: Wistron NeWeb Corp., Hsinchu (TW)

(72) Inventor: Chun-Lin Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 189 days.

(21) Appl. No.: 18/350,151

(22) Filed: Jul. 11, 2023

(65) Prior Publication Data

US 2024/0039172 A1 Feb. 1, 2024

(30) Foreign Application Priority Data

Jul. 26, 2022 (TW) ................................. 111127892

(51) Int. Cl.
*H01Q 21/24* (2006.01)
*H01Q 1/38* (2006.01)

(52) U.S. Cl.
CPC ............... *H01Q 21/24* (2013.01); *H01Q 1/38* (2013.01)

(58) Field of Classification Search
CPC .......... H01Q 1/38; H01Q 21/10; H01Q 21/24; H01Q 9/26
See application file for complete search history.

(56) References Cited

U.S. PATENT DOCUMENTS 7,463,209 B2 12/2008 Tang et al.
9,496,932 B1 * 11/2016 Prendergast ......... H04B 7/0691
9,865,920 B1 * 1/2018 Kuo ....................... H01Q 5/321
10,840,582 B2 * 11/2020 Woo ......................... H03H 7/38
2005/0266904 A1 * 12/2005 Kitaji .................. H04B 7/0842 455/101
2014/0370804 A1 * 12/2014 Dorning ................ H04B 5/263 455/41.1
2015/0130659 A1 * 5/2015 Mori ....................... G01S 13/88 342/175
2016/0036474 A1 * 2/2016 Broyde ............. H01Q 21/0006 455/77
2016/0112991 A1 * 4/2016 Chen ...................... H04B 1/525 455/553.1
2017/0085005 A1 * 3/2017 Aue ......................... H04B 1/40
2019/0165447 A1 * 5/2019 Furlan .................... H01Q 9/285
(Continued)

FOREIGN PATENT DOCUMENTS

CN 101005156 A 7/2007
TW 200629654 A 8/2006

*Primary Examiner* — Thien M Le
(74) *Attorney, Agent, or Firm* — McClure, Qualey & Rodack, LLP

(57) ABSTRACT

An antenna system includes a signal feeding element, a first antenna element, a second antenna element, a first transmission line, and a second transmission line. The first antenna element is coupled to a first connection point. The second antenna element is coupled to a second connection point. The first transmission line is coupled between the signal feeding element and the first connection point. The second transmission line is coupled between the signal feeding element and the second connection point. The length of the second transmission line is substantially equal to that of the first transmission line. The first antenna element and the second antenna element substantially have opposite polarization directions. Therefore, the radiation pattern of the antenna system can provide a plurality of different gain peaks.

14 Claims, 8 Drawing Sheets

(56) References Cited

U.S. PATENT DOCUMENTS

| | | | | |
|---|---|---|---|---|
| 2019/0252785 | A1* | 8/2019 | McMichael .......... | H01Q 9/0428 |
| 2023/0369759 | A1* | 11/2023 | Huang ................. | H01Q 9/0407 |
| 2024/0291168 | A1* | 8/2024 | Kim ..................... | H01Q 21/245 |

* cited by examiner

ANTENNA SYSTEM

CROSS REFERENCE TO RELATED APPLICATIONS

This application claims priority of Taiwan Patent Application No. 111127892 filed on Jul. 26, 2022, the entirety of which is incorporated by reference herein.

BACKGROUND OF THE INVENTION

Field of the Invention

The disclosure generally relates to an antenna system, and more particularly, to an antenna system with a radiation pattern having multiple gain peaks.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Wireless access points are indispensable elements for mobile devices in a room to connect to the Internet at a high speed. However, since an indoor environment can experience serious signal reflection and multipath fading, wireless access points should process signals from a variety of transmission directions simultaneously. Accordingly, it has become a critical challenge for current designers to design a small-size antenna system with multiple radiation directions in the limited space of a wireless access point.

BRIEF SUMMARY OF THE INVENTION

In an exemplary embodiment, the invention is directed to an antenna system that includes a signal feeding element, a first antenna element, a second antenna element, a first transmission line, and a second transmission line. The first antenna element is coupled to a first connection point. The second antenna element is coupled to a second connection point. The first transmission line is coupled between the signal feeding element and the first connection point. The second transmission line is coupled between the signal feeding element and the second connection point. The length of the second transmission line is substantially equal to the length of the first transmission line. The first antenna element and the second antenna element substantially have opposite polarization directions. Therefore, the radiation pattern of the antenna system can provide a plurality of different gain peaks.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
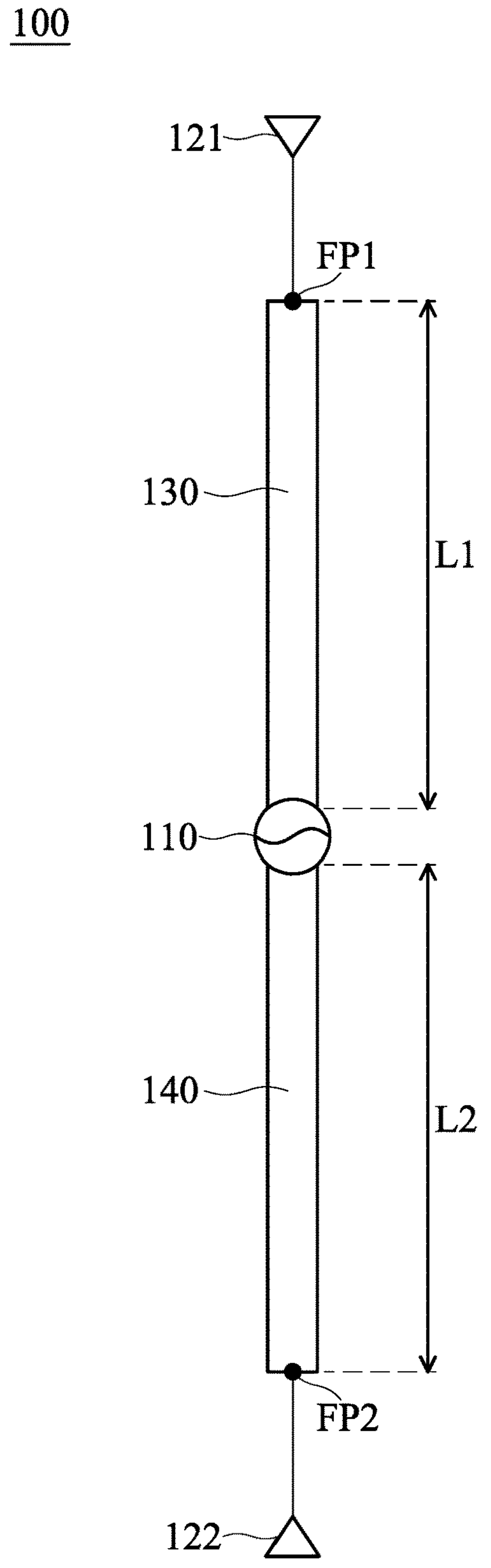
FIG. 1 is a diagram of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna system 100 according to an embodiment of the invention. For example, the antenna system 100 may be applied to a wireless access point, but it is not limited thereto. In the embodiment of FIG. 1, the antenna system 100 at least includes a signal feeding element 110, a first antenna element 121, a second antenna element 122, a first transmission line 130, and a second transmission line 140.

The signal feeding element 110 may be implemented with one or more feeding metal elements. For example, the signal feeding element 110 may be coupled to an RF (Radio Frequency) module (not shown) for exciting the antenna system 100. The first antenna element 121 is coupled to a first connection point FP1. The second antenna element 122 is coupled to a second connection point FP2. The shapes and types of the first antenna element 121 and the second antenna element 122 are not limited in the invention. For example, each of the first antenna element 121 and the second antenna element 122 may be a monopole antenna, a dipole antenna, a patch antenna, a loop antenna, a PIFA (Planar Inverted F Antenna), or a hybrid antenna.

The shapes and types of the first transmission line 130 and the second transmission line 140 are not limited in the invention. The first transmission line 130 is coupled between the signal feeding element 110 and the first connection point FP1. The second transmission line 140 is coupled between the signal feeding element 110 and the second connection point FP2. It should be noted that the length L2 of the second transmission line 140 is substantially equal to the length L1 of the first transmission line 130. In some embodiments, the first antenna element 121 and the second antenna element 122 substantially have opposite polarization directions. Thus, the radiation pattern of the antenna system 100 can provide a plurality of different gain peaks. With such a design, the antenna system 100 is configured to receive or transmit wireless signals in a variety of directions, thereby enhancing the whole communication quality of the relative device.

The following embodiments will introduce different configurations and detailed structural features of the antenna system 100. It should be understood that these figures and descriptions are merely exemplary, rather than limitations of the invention.

Figure 2:
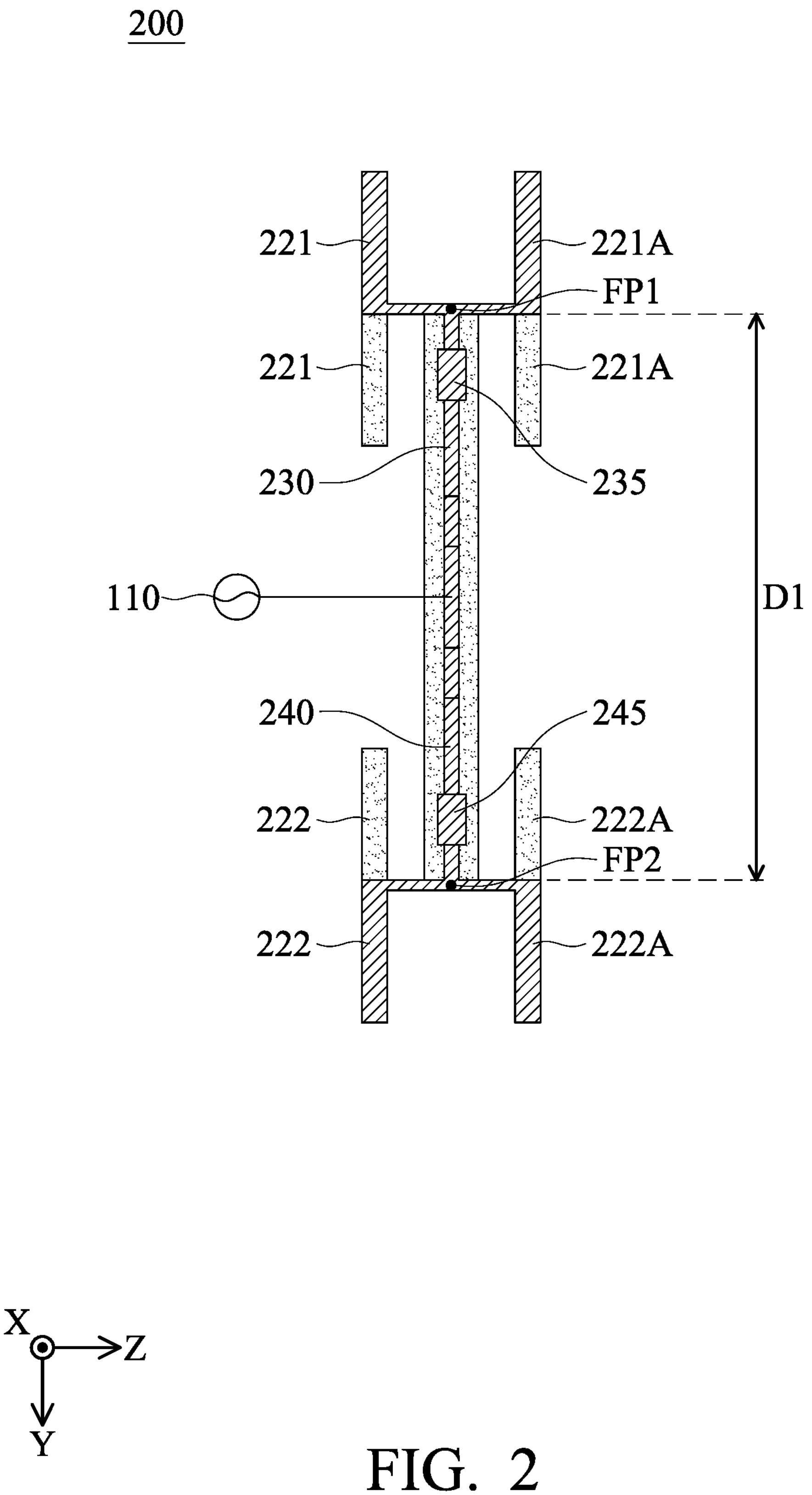
FIG. 2 is a front view of an antenna system according to an embodiment of the invention.

FIG. 2 is a front view of an antenna system 200 according to an embodiment of the invention. FIG. 2 is similar to FIG. 1. In the embodiment of FIG. 2, the antenna system 200 includes a signal feeding element 210, a first antenna element 221, a second antenna element 222, a first transmission line 230, a second transmission line 240, a first auxiliary antenna element 221A, and a second auxiliary antenna element 222A. In some embodiments, the antenna system 200 can cover an operational frequency band from 5150 MHz to 5850 MHz or from 5925 MHz to 7125 MHz. Therefore, the antenna system 200 can support the wideband operations of WLAN (Wireless Local Area Networks) 5 GHz or the next-generation Wi-Fi 6E.

Each of the first antenna element 221, the second antenna element 222, the first auxiliary antenna element 221A, and the second auxiliary antenna element 222A may be implemented with a dipole antenna. The above antenna elements may be distributed over a top surface and a bottom surface of a dielectric substrate (in order to simplify the figure, the dielectric substrate is not displayed in FIG. 2). Specifically, the first antenna element 221 and the first auxiliary antenna element 221A are coupled to a first connection point FP1, so as to form a first antenna array. The second antenna element 222 and the second auxiliary antenna element 222A are coupled to a second connection point FP2, so as to form a second antenna array. The first antenna array and the second antenna array may substantially have opposite polarization directions. For example, the polarization direction of the first antenna array may be parallel to −Y-axis, and the polarization direction of the second antenna array may be parallel to +Y-axis, but they are not limited thereto. In some embodiments, the first antenna element 221 and the second antenna element 222 are arranged in the same straight line, and the first auxiliary antenna element 221A and the second auxiliary antenna element 222A are arranged in another parallel straight line. It should be understood that the first auxiliary antenna element 221A and the second auxiliary antenna element 222A are used to improve the symmetry of the whole antenna system 200, and they are optional components and may be omitted in other embodiments.

The first transmission line 230 is coupled between the signal feeding element 110 and the first connection point FP1. The second transmission line 240 is coupled between the signal feeding element 110 and the second connection point FP2. The length of the second transmission line 240 may be substantially equal to the length of the first transmission line 230. In some embodiments, the first transmission line 230 further includes a first widening portion 235, and the second transmission line 240 further includes a second widening portion 245, so as to fine-tune the impedance matching of the antenna system 200. For example, each of the first widening portion 235 and the second widening portion 245 may substantially have a rectangular shape or a square shape. However, the invention is not limited thereto. In alternative embodiments, each of the first transmission line 230 and the second transmission line 240 may substantially have an equal-width straight-line shape.

Figure 3:
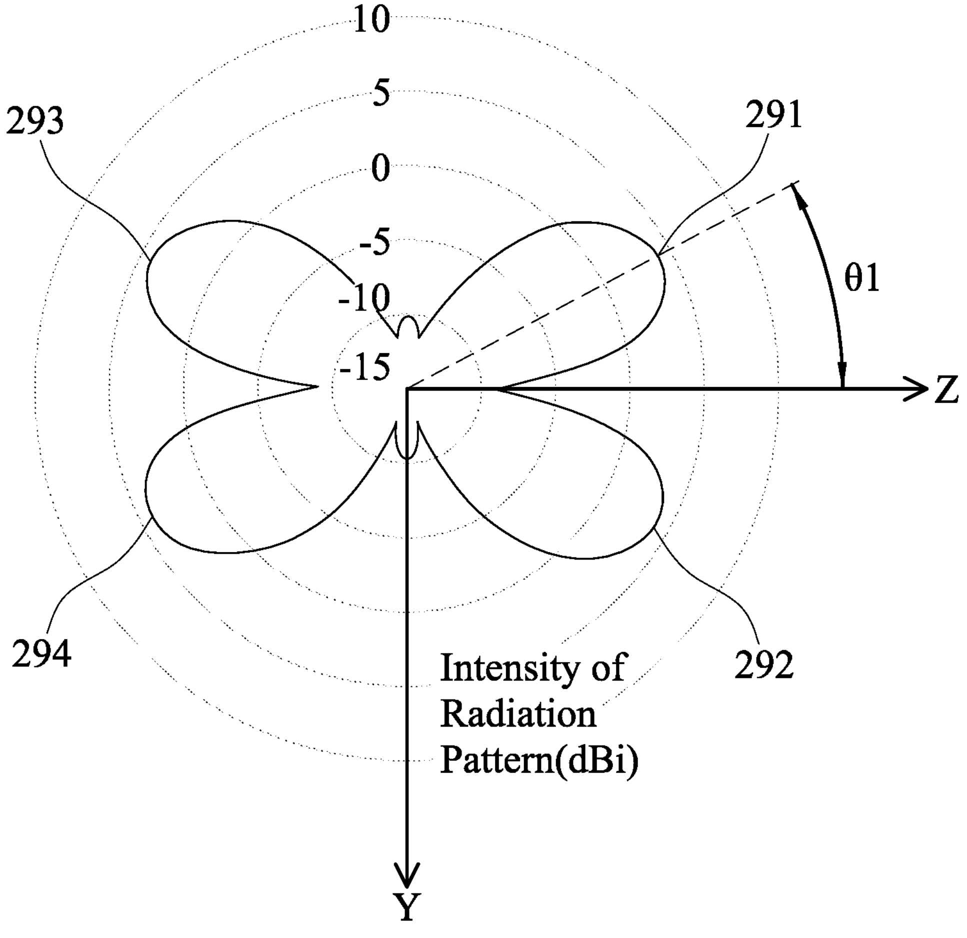
FIG. 3 is a radiation pattern of an antenna system according to an embodiment of the invention.

FIG. 3 is a radiation pattern of the antenna system 200 according to an embodiment of the invention (which may be measured on the YZ-plane). According to the measurement of FIG. 3, the radiation pattern of the antenna system 200 can provide a first gain peak 291, a second gain peak 292, a third gain peak 293, and a fourth gain peak 294. A tilt angle θ1 is formed between each of the above gain peaks and ±Z-axis. Generally, the antenna system 200 can provide a first main beam shifted upwardly and a second main beam shifted downwardly. The first main beam includes the first gain peak 291 and the third gain peak 293. The second main beam includes the second gain peak 292 and the fourth gain peak 294. For example, if the antenna system 200 is arranged horizontally along the XZ-plane on the middle floor of an apartment, the first gain peak 291 and the third gain peak 293 of the first main beam can be used to support high-floor communication, and the second gain peak 292 and the fourth gain peak 294 of the second main beam can be used to support low-floor communication, but they are not limited thereto. In some embodiments, the element sizes of the antenna system 200 will be described as follows. In the antenna system 200, the center-to-center distance D1 between the first antenna element 221 and the second antenna element 222 (or the center-to-center distance D1 between the first auxiliary antenna element 221A and the second auxiliary antenna element 222A) may be substantially equal to 0.64 free-space wavelength (0.64λ) of the operational frequency band of the antenna system 200. The tilt angle θ1 may be about 30 degrees. The above ranges of element sizes are calculated and obtained according to many experiment results, and they help to optimize the operational bandwidth and the impedance matching of the antenna system 200. Other features of the antenna system 200 of FIG. 2 are similar to those of the antenna system 100 of FIG. 1. Accordingly, the two embodiments can achieve similar levels of performance.

Figure 4:
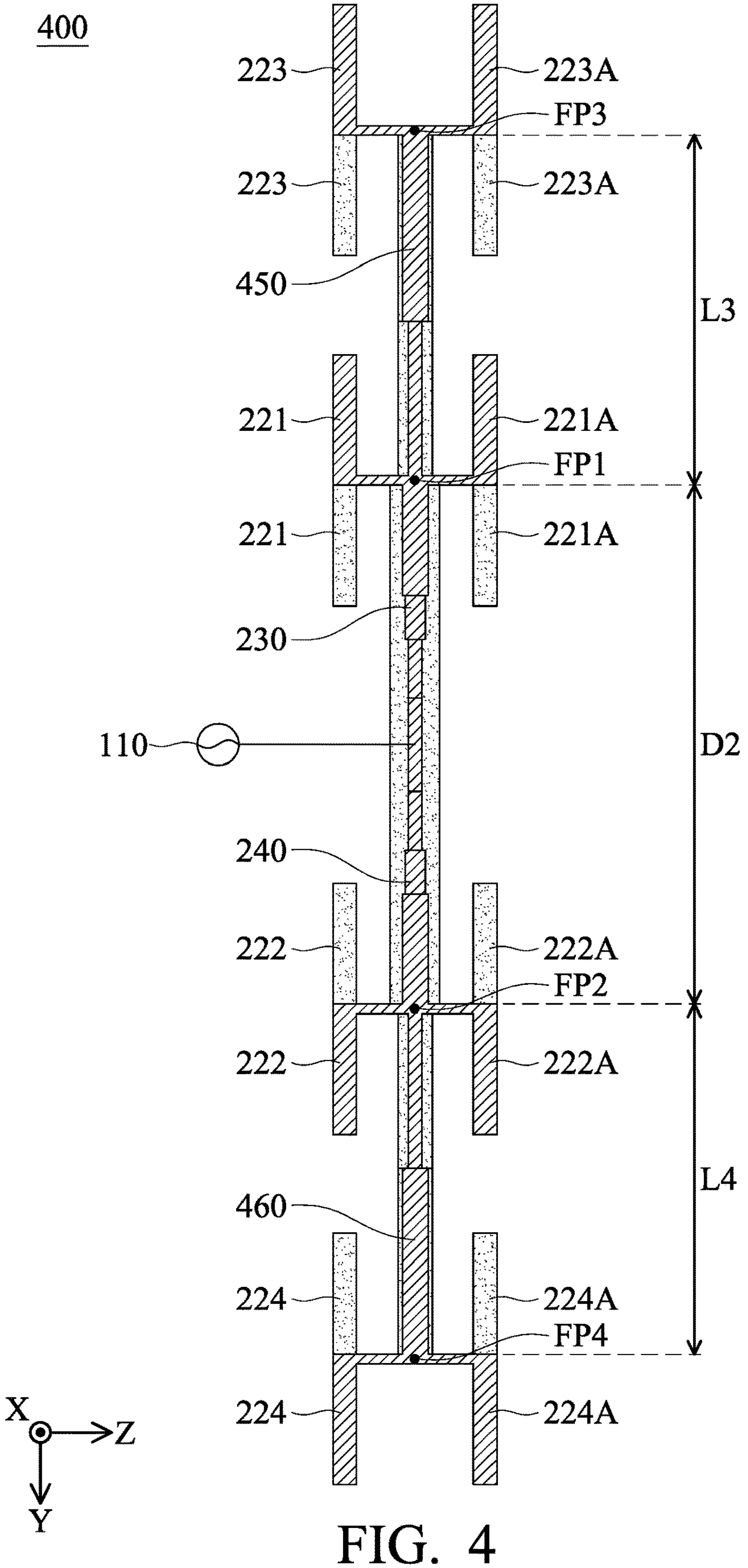
FIG. 4 is a front view of an antenna system according to an embodiment of the invention.

FIG. 4 is a front view of an antenna system 400 according to an embodiment of the invention. FIG. 4 is similar to FIG. 2. In the embodiment of FIG. 4, besides the aforementioned elements, the antenna system 400 further includes a third antenna element 223, a fourth antenna element 224, a third transmission line 450, a fourth transmission line 460, a third auxiliary antenna element 223A, and a fourth auxiliary antenna element 224A. It should be understood that the shapes of the first transmission line 230 and the second transmission line 240 may be slightly changed to fine-tune the impedance matching of the antenna system 400. In some embodiments, the antenna system 400 can cover an operational frequency band from 5150 MHz to 5850 MHz or from 5925 MHz to 7125 MHz.

Each of the third antenna element 223, the fourth antenna element 224, the third auxiliary antenna element 223A, and the fourth auxiliary antenna element 224A may be implemented with a dipole antenna. Specifically, the third antenna element 223 and the third auxiliary antenna element 223A are coupled to a third connection point FP3, so as to form a third antenna array. The fourth antenna element 224 and the fourth auxiliary antenna element 224A are coupled to a fourth connection point FP4, so as to form a fourth antenna array. The third antenna array and the fourth antenna array may substantially have opposite polarization directions. For example, the polarization direction of the third antenna array may be parallel to −Y-axis, and the polarization direction of the fourth antenna array may be parallel to +Y-axis, but they are not limited thereto. In some embodiments, the first antenna element 221, the second antenna element 222, the third antenna element 223, and the fourth antenna element 224 are arranged in the same straight line. The first auxiliary antenna element 221A, the second auxiliary antenna element 222A, the third auxiliary antenna element 223A, and the fourth auxiliary antenna element 224A are arranged in another parallel straight line.

The third transmission line 450 is coupled between the first connection point FP1 and the third connection point FP3. The fourth transmission line 460 is coupled between the second connection point FP2 and the fourth connection point FP4. The length L4 of the fourth transmission line 460 may be substantially equal to the length L3 of the third transmission line 450. In some embodiments, each of the third transmission line 450 and the fourth transmission line 460 substantially has a variable-width straight-line shape, so as to fine-tune the impedance matching of the antenna system 400. However, the invention is not limited thereto. In alternative embodiments, each of the third transmission line 450 and the fourth transmission line 460 may substantially have an equal-width straight-line shape.

Figure 5:
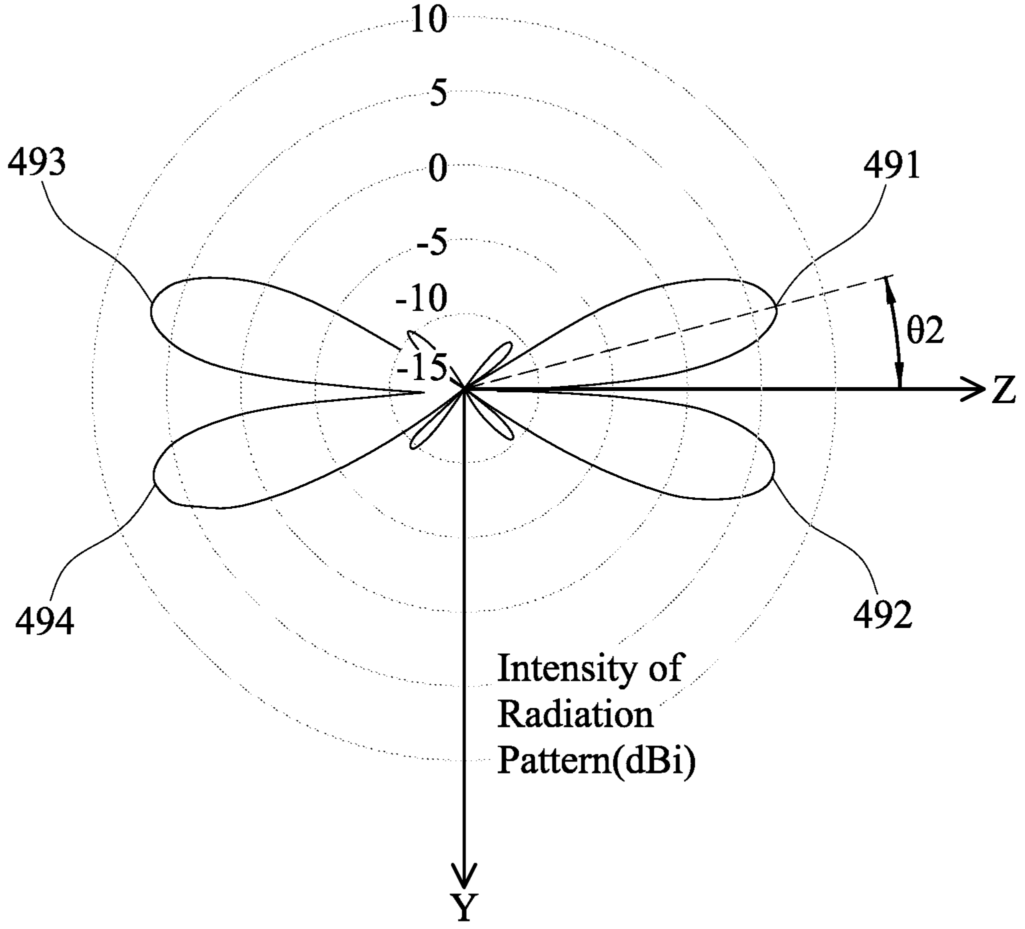
FIG. 5 is a radiation pattern of an antenna system according to an embodiment of the invention.

FIG. 5 is a radiation pattern of the antenna system 400 according to an embodiment of the invention (which may be measured on the YZ-plane). According to the measurement of FIG. 5, the radiation pattern of the antenna system 400 can provide a first gain peak 491, a second gain peak 492, a third gain peak 493, and a fourth gain peak 494. A tilt angle θ2 is formed between each of the above gain peaks and ±Z-axis. Generally, the antenna system 400 can provide a first main beam shifted upwardly and a second main beam shifted downwardly. The first main beam includes the first gain peak 491 and the third gain peak 493. The second main beam includes the second gain peak 492 and the fourth gain peak 494. In some embodiments, the element sizes of the antenna system 400 will be described as follows. In the antenna system 400, the center-to-center distance D2 between the first antenna element 221 and the second antenna element 222 may be substantially equal to 0.81 free-space wavelength (0.81λ) of the operational frequency band of the antenna system 400. The length L3 of the third transmission line 450 may be substantially equal to 1 effective wavelength (1 λg) of the operational frequency band of the antenna system 400. The length L4 of the fourth transmission line 460 may be substantially equal to 1 effective wavelength (1 λg) of the operational frequency band of the antenna system 400. The tilt angle θ2 may be about 15 degrees. In other words, after more antenna elements are used, the radiation gain of the antenna system 400 becomes higher, and the tilt angle θ2 of its radiation pattern becomes smaller. It should be understood that the term "wavelength (λ)" over the disclosure means the wavelength in free space. If a dielectric material is used (e.g., a dielectric substrate), it may be modified to "effective wavelength (λg)" according to an effective dielectric constant between the dielectric material and the free space. Conversely, if no dielectric material is used, the effective wavelength (λg) may be the same as the free-space wavelength (λ). The above ranges of element sizes are calculated and obtained according to many experiment results, and they help to optimize the operational bandwidth and the impedance matching of the antenna system 400. Other features of the antenna system 400 of FIG. 4 are similar to those of the antenna system 200 of FIG. 2. Accordingly, the two embodiments can achieve similar levels of performance.

Figure 6:
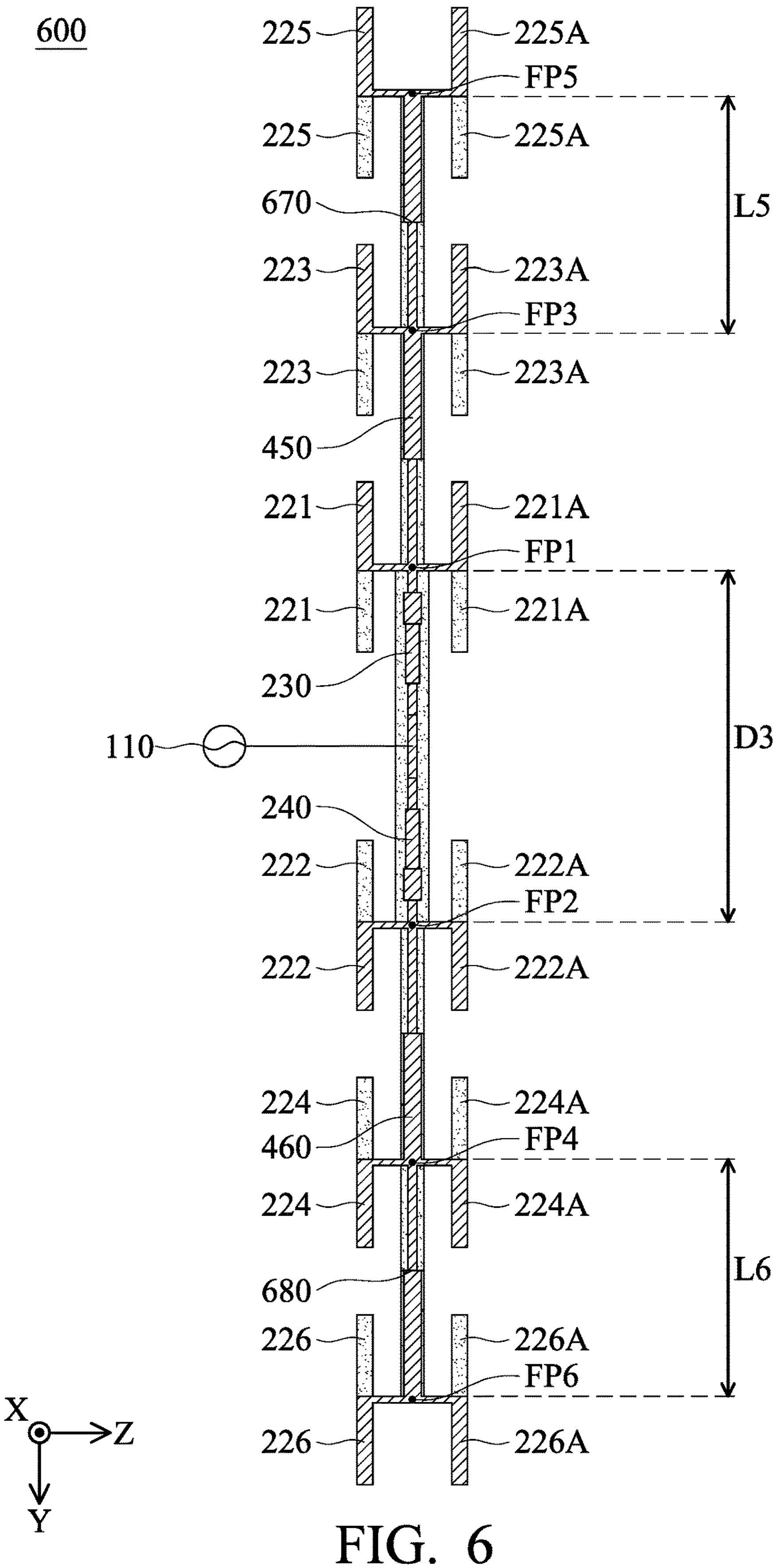
FIG. 6 is a front view of an antenna system according to an embodiment of the invention.

FIG. 6 is a front view of an antenna system 600 according to an embodiment of the invention. FIG. 6 is similar to FIG. 4. In the embodiment of FIG. 6, besides the aforementioned elements, the antenna system 600 further includes a fifth antenna element 225, a sixth antenna element 226, a fifth transmission line 670, a sixth transmission line 680, a fifth auxiliary antenna element 225A, and a sixth auxiliary antenna element 226A. It should be understood that the shapes of the first transmission line 230, the second transmission line 240, the third transmission line 450, and the fourth transmission line 460 may be slightly changed to fine-tune the impedance matching of the antenna system 600. In some embodiments, the antenna system 600 can cover an operational frequency band from 5150 MHz to 5850 MHz or from 5925 MHz to 7125 MHz.

Each of the fifth antenna element 225, the sixth antenna element 226, the fifth auxiliary antenna element 225A, and the sixth auxiliary antenna element 226A may be implemented with a dipole antenna. Specifically, the fifth antenna element 225 and the fifth auxiliary antenna element 225A are coupled to a fifth connection point FP5, so as to form a fifth antenna array. The sixth antenna element 226 and the sixth auxiliary antenna element 226A are coupled to a sixth connection point FP6, so as to form a sixth antenna array. The fifth antenna array and the sixth antenna array may substantially have opposite polarization directions. For example, the polarization direction of the fifth antenna array may be parallel to −Y-axis, and the polarization direction of the sixth antenna array may be parallel to +Y-axis, but they are not limited thereto. In some embodiments, the first antenna element 221, the second antenna element 222, the third antenna element 223, the fourth antenna element 224, the fifth antenna element 225, and the sixth antenna element 226 are arranged in the same straight line. The first auxiliary antenna element 221A, the second auxiliary antenna element 222A, the third auxiliary antenna element 223A, the fourth auxiliary antenna element 224A, the fifth auxiliary antenna element 225A, and the sixth auxiliary antenna element 226A are arranged in another parallel straight line.

The fifth transmission line 670 is coupled between the third connection point FP3 and the fifth connection point FP5. The sixth transmission line 680 is coupled between the fourth connection point FP4 and the sixth connection point FP6. The length L6 of the sixth transmission line 680 may be substantially equal to the length L5 of the fifth transmission line 670. In some embodiments, each of the fifth transmission line 670 and the sixth transmission line 680 substantially has a variable-width straight-line shape, so as to fine-tune the impedance matching of the antenna system 600. However, the invention is not limited thereto. In alternative embodiments, each of the fifth transmission line 670 and the sixth transmission line 680 may substantially have an equal-width straight-line shape.

Figure 7:
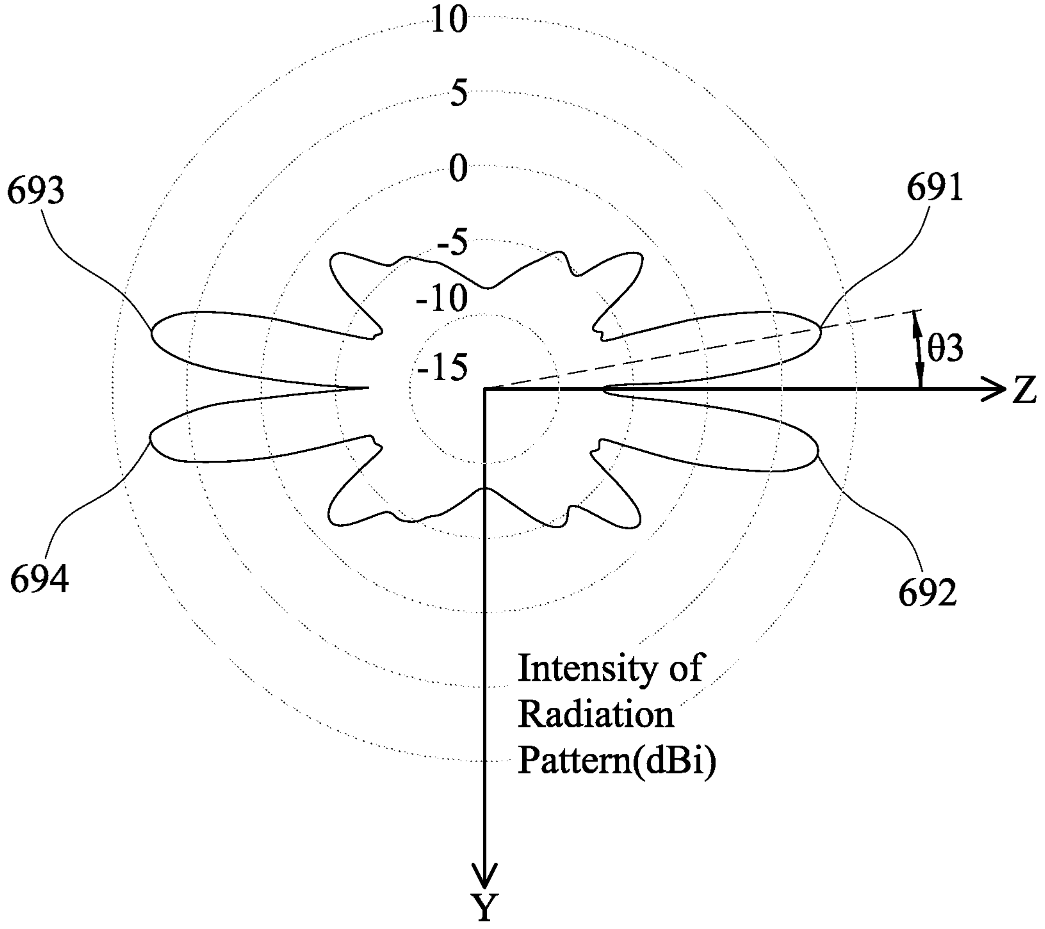
FIG. 7 is a radiation pattern of an antenna system according to an embodiment of the invention.

FIG. 7 is a radiation pattern of the antenna system 600 according to an embodiment of the invention (which may be measured on the YZ-plane). According to the measurement of FIG. 7, the radiation pattern of the antenna system 600 can provide a first gain peak 691, a second gain peak 692, a third gain peak 693, and a fourth gain peak 694. A tilt angle θ3 is formed between each of the above gain peaks and ±Z-axis. Generally, the antenna system 600 can provide a first main beam shifted upwardly and a second main beam shifted downwardly. The first main beam includes the first gain peak 691 and the third gain peak 693. The second main beam includes the second gain peak 692 and the fourth gain peak 694. In some embodiments, the element sizes of the antenna system 600 will be described as follows. In the antenna system 600, the center-to-center distance D3 between the first antenna element 221 and the second antenna element 222 may be substantially equal to 0.998 free-space wavelength (0.998λ) of the operational frequency band of the antenna system 600. The length L5 of the fifth transmission line 670 may be substantially equal to 1 effective wavelength (1 λg) of the operational frequency band of the antenna system 600. The length L6 of the sixth transmission line 680 may be substantially equal to 1 effective wavelength (1 λg) of the operational frequency band of the antenna system 600. The tilt angle θ3 may be about 10 degrees. In other words, after more antenna elements are used, the radiation gain of the antenna system 600 further becomes higher, and the tilt angle θ3 of its radiation pattern further becomes smaller. The above ranges of element sizes are calculated and obtained according to many experiment results, and they help to optimize the operational bandwidth and the impedance matching of the antenna system 600. Other features of the antenna system 600 of FIG. 6 are similar to those of the antenna system 400 of FIG. 4. Accordingly, the two embodiments can achieve similar levels of performance.

Generally, the tilt angle of each gain peak of the radiation pattern of the aforementioned antenna system can be calculated using the following equation (1):

$$\theta = \frac{D}{N \cdot \lambda} \cdot \sin^{-1}\left(\frac{\lambda}{2 \cdot D}\right) \tag{1}$$

where "θ" represents the tilt angle, "D" represents the center-to-center distance between the first antenna element and the second antenna element, "λ" represents the free-space wavelength of the operational frequency band of the antenna system, and "N" represents a half of the total number of antenna elements (excluding auxiliary antenna element) (e.g., N may be equal to 1 in the embodiments of FIG. 1 and FIG. 2, N may be equal to 2 in the embodiment of FIG. 4, and N may be equal to 3 in the embodiment of FIG. 6).

The above equation (1) is designed on the condition that the center-to-center distance (D) is shorter than the free-space wavelength (λ) (i.e., D<λ). On the contrary, if the center-to-center distance (D) is longer than the free-space wavelength (λ) (i.e., D>λ), the tilt angle of each gain peak of the radiation pattern of the aforementioned antenna system can be calculated using the following equation (2):

$$\theta = \frac{\lambda}{N \cdot D} \cdot \sin^{-1}\left(\frac{\lambda}{2 \cdot D}\right) \tag{2}$$

Figure 8:
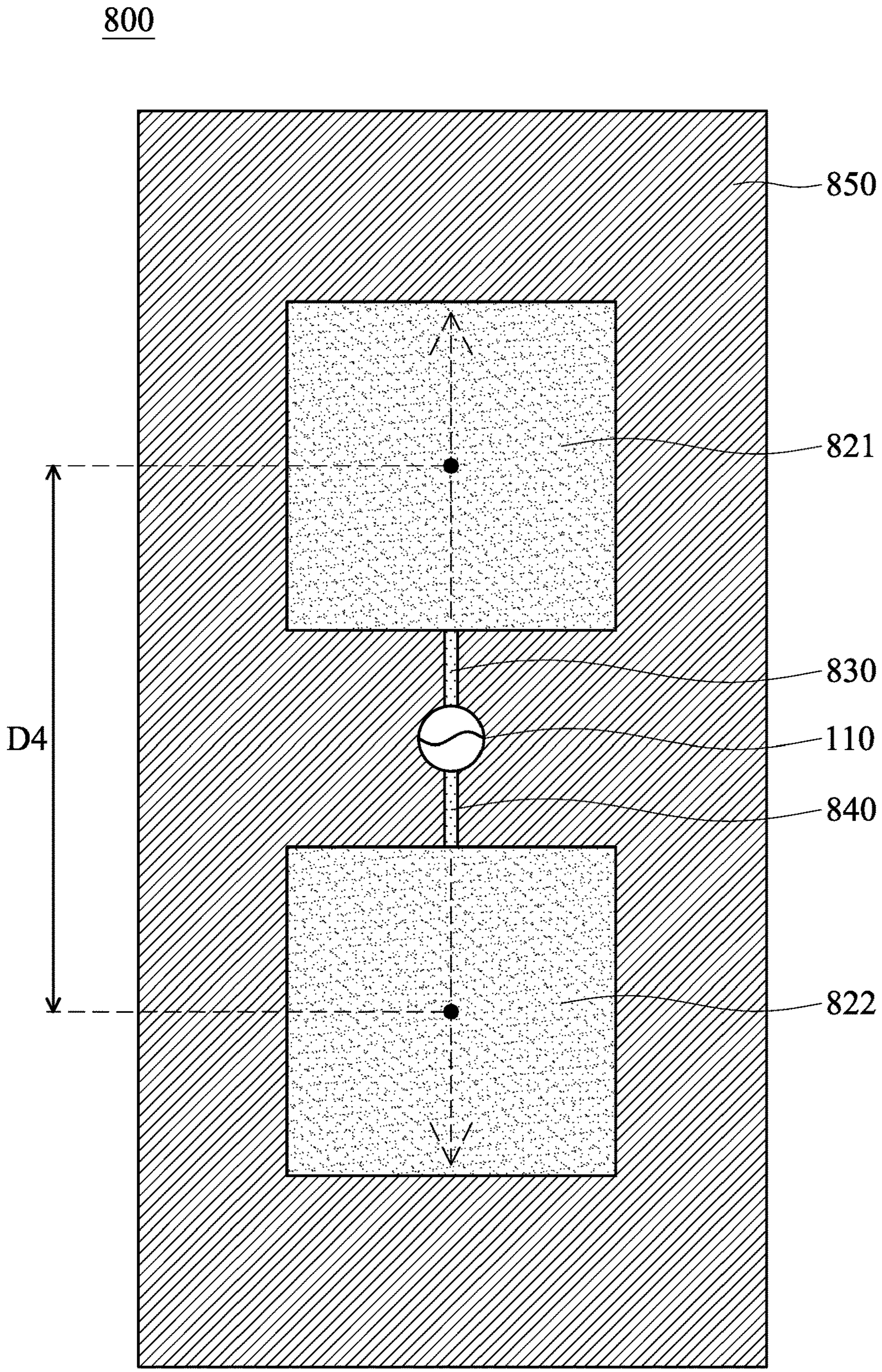
FIG. 8 is a front view of an antenna system according to another embodiment of the invention.

FIG. 8 is a front view of an antenna system 800 according to another embodiment of the invention. FIG. 8 is similar to FIG. 1. In the embodiment of FIG. 8, the antenna system 800 includes a signal feeding element 110, a first antenna element 821, a second antenna element 822, a first transmission line 830, a second transmission line 840, and a ground plane 850. Each of the first antenna element 821 and the second antenna element 822 may be a patch antenna. The ground plane 850 is adjacent to the first antenna element 821 and the second antenna element 822. Similarly, the first antenna element 821 and the second antenna element 822 may substantially have opposite polarization directions, and the length of the second transmission line 840 may be substantially equal to the length of the first transmission line 830. It should be noted that the term "adjacent" or "close" over the disclosure means that the distance (spacing) between two corresponding elements is smaller than a predetermined distance (e.g., 10 mm or shorter), but often does not mean that the two corresponding elements directly touch each other (i.e., the aforementioned distance/spacing therebetween is reduced to 0). In the antenna system 800, the center-to-center distance D4 between the first antenna element 821 and the second antenna element 822 can be applied to the above equation (1) or (2), so as to calculate and obtain the tilt angle of the corresponding gain peak. Other features of the antenna system 800 of FIG. 8 are similar to those of the antenna system 100 of FIG. 1. Accordingly, the two embodiments can achieve similar levels of performance.

The invention proposes a novel antenna system. In comparison to the conventional design, the invention has at least the advantages of radiation pattern with multiple gain peaks, small size, and low manufacturing cost. Therefore, the invention is suitable for application in a variety of communication devices.

Note that the above element sizes, element shapes, and frequency ranges are not limitations of the invention. An antenna designer can fine-tune these settings or values according to different requirements. It should be understood that the antenna system of the invention is not limited to the configurations of FIGS. 1-8. The invention may merely include any one or more features of any one or more embodiments of FIGS. 1-8. In other words, not all of the features displayed in the figures should be implemented in the antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:

a signal feeding element;

a first antenna element, coupled to a first connection point;

a second antenna element, coupled to a second connection point;

a first transmission line, coupled between the signal feeding element and the first connection point; and a second transmission line, coupled between the signal feeding element and the second connection point, wherein a length of the second transmission line is substantially equal to that of the first transmission line;

wherein the first antenna element and the second antenna element substantially have opposite polarization directions, such that a radiation pattern of the antenna system provides a plurality of different gain peaks;

wherein the antenna system covers an operational frequency band;

wherein a center-to-center distance between the first antenna element and the second antenna element is substantially equal to 0.64, 0.81 or 0.998 free-space wavelength of the operational frequency band.

2. The antenna system as claimed in claim 1, wherein the operational frequency band is from 5150 MHz to 5850 MHz or from 5925 MHz to 7125 MHz.

3. The antenna system as claimed in claim 2, further comprising:

a third antenna element, coupled to a third connection point;

a fourth antenna element, coupled to a fourth connection point;

a third transmission line, coupled between the first connection point and the third connection point; and a fourth transmission line, coupled between the second connection point and the fourth connection point.

4. The antenna system as claimed in claim 3, wherein a length of each of the third transmission line and the fourth transmission line is substantially equal to 1 effective wavelength of the operational frequency band.

5. The antenna system as claimed in claim 3, further comprising:

a third auxiliary antenna element, coupled to the third connection point; and a fourth auxiliary antenna element, coupled to the fourth connection point.

6. The antenna system as claimed in claim 3, further comprising:

a fifth antenna element, coupled to a fifth connection point;

a sixth antenna element, coupled to a sixth connection point;

a fifth transmission line, coupled between the third connection point and the fifth connection point; and a sixth transmission line, coupled between the fourth connection point and the sixth connection point.

7. The antenna system as claimed in claim 6, wherein a length of each of the fifth transmission line and the sixth transmission line is substantially equal to 1 effective wavelength of the operational frequency band.

8. The antenna system as claimed in claim 6, further comprising:

a fifth auxiliary antenna element, coupled to the fifth connection point; and a sixth auxiliary antenna element, coupled to the sixth connection point.

9. The antenna system as claimed in claim 1, wherein each of the first antenna element and the second antenna element is a dipole antenna.

10. The antenna system as claimed in claim 1, further comprising:

a first auxiliary antenna element, coupled to the first connection point; and a second auxiliary antenna element, coupled to the second connection point.

11. The antenna system as claimed in claim 1, wherein each of the first antenna element and the second antenna element is a patch antenna.

12. The antenna system as claimed in claim 11, further comprising:

a ground plane, disposed adjacent to the first antenna element and the second antenna element.

13. An antenna system, comprising:

a signal feeding element;

a first antenna element, coupled to a first connection point;

a second antenna element, coupled to a second connection point;

a first transmission line, coupled between the signal feeding element and the first connection point; and a second transmission line, coupled between the signal feeding element and the second connection point, wherein a length of the second transmission line is substantially equal to that of the first transmission line;

wherein the first antenna element and the second antenna element substantially have opposite polarization directions, such that a radiation pattern of the antenna system provides a plurality of different gain peaks;

wherein the antenna system covers an operational frequency band;

wherein a tilt angle of each of the gain peaks is calculated using the following equation:

$$\theta = \frac{D}{N \cdot \lambda} \cdot \sin^{-1}\left(\frac{\lambda}{2 \cdot D}\right)$$

wherein "θ" represents the tile angle, "D" represents the center-to-center distance between the first antenna element and the second antenna element, "λ" represents a free-space wavelength of the operational frequency band, and "N" represents a half of a total number of antenna elements;

wherein the center-to-center distance is shorter than the free-space wavelength.

14. An antenna system, comprising:

a signal feeding element;

a first antenna element, coupled to a first connection point;

a second antenna element, coupled to a second connection point;

a first transmission line, coupled between the signal feeding element and the first connection point; and a second transmission line, coupled between the signal feeding element and the second connection point, wherein a length of the second transmission line is substantially equal to that of the first transmission line;

wherein the first antenna element and the second antenna element substantially have opposite polarization directions, such that a radiation pattern of the antenna system provides a plurality of different gain peaks;

wherein the antenna system covers an operational frequency band;

wherein a tilt angle of each of the gain peaks is calculated using the following equation:

$$\theta = \frac{\lambda}{N \cdot D} \cdot \sin^{-1}\left(\frac{\lambda}{2 \cdot D}\right)$$

wherein "θ" represents the tilt angle, "D" represents a center-to-center distance between the first antenna element and the second antenna element, "λ" represents a free-space wavelength of the operational frequency band, and "N" represents a half of a total number of antenna elements;

wherein the center-to-center distance is longer than the free-space wavelength.

* * * * *